United States Patent
Schlingmann et al.

(10) Patent No.: US 10,689,000 B1
(45) Date of Patent: Jun. 23, 2020

(54) PLUG-IN HYBRID ELECTRIC VEHICLE COLD WEATHER MOTIVE WARM UP STRATEGY

(71) Applicants: Hyundai Motor Company, Seoul (KR); KIA Motors Corporation, Seoul (KR)

(72) Inventors: Dean Schlingmann, San Dimas, CA (US); Ryan Miller, Chino, CA (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/353,696

(22) Filed: Mar. 14, 2019

(51) Int. Cl.
| | | |
|---|---|---|
| *B60W 10/30* | (2006.01) | |
| *B60H 1/00* | (2006.01) | |
| *B60W 30/188* | (2012.01) | |
| *B60W 20/13* | (2016.01) | |

(52) U.S. Cl.
CPC ......... *B60W 30/1886* (2013.01); *B60H 1/004* (2013.01); *B60W 10/30* (2013.01); *B60W 20/13* (2016.01); *B60W 2900/00* (2013.01)

(58) Field of Classification Search
CPC .. B60W 30/1886; B60W 20/13; B60W 10/30; B60W 2900/00; B60H 1/004
USPC .................................................. 180/65.275
See application file for complete search history.

(56) References Cited

U.S. PATENT DOCUMENTS

| | | | |
|---|---|---|---|
| 6,532,926 B1* | 3/2003 | Kuroda ................ | B60W 10/30 123/179.4 |
| 2012/0072063 A1 | 3/2012 | Kato et al. | |
| 2014/0288736 A1 | 9/2014 | Martin et al. | |
| 2015/0025721 A1 | 1/2015 | Thompson et al. | |
| 2018/0105161 A1* | 4/2018 | Huh ...................... | B60W 20/40 |
| 2018/0297443 A1* | 10/2018 | Gibble ................. | B60H 1/3208 |

FOREIGN PATENT DOCUMENTS

| | | |
|---|---|---|
| CN | 105922984 A | 9/2016 |
| JP | 2009097502 A | 5/2009 |

\* cited by examiner

*Primary Examiner* — John D Walters
(74) *Attorney, Agent, or Firm* — Brinks Gilson & Lione

(57) ABSTRACT

Disclosed herein is a method of more quickly heating the cabin air in a hybrid electric vehicle. In one aspect, when a switch is engaged, and a temperature sensor indicates that an ambient temperature is below a predetermined threshold, and an engine coolant temperature is below a predetermined threshold, the method allows for operation of the vehicle in a charge sustaining mode in order to increase the load on the engine and generate more heat for the cabin.

19 Claims, 4 Drawing Sheets

— Page US 10,689,000 B1 —

PLUG-IN HYBRID ELECTRIC VEHICLE COLD WEATHER MOTIVE WARM UP STRATEGY

FIELD

The present disclosure relates to systems and methods for heating the cabin of a hybrid electric vehicle, such as a plug-in hybrid, in cold weather conditions.

BACKGROUND

The statements in this section merely provide background information related to the present disclosure and may not constitute prior art.

A plug-in hybrid electric vehicle (PHEV) is a type of a hybrid vehicle that has both an internal combustion engine, which produces driving power by burning fossil fuel, and an electric motor, which produces driving power using electric energy. A general hybrid vehicle converts the driving power of the combustion engine to charge a high-voltage battery, which supplies electric power to the electric motor. A plug-in hybrid vehicle has an additional device for receiving electric power by being directly connected to an external power source, and thus the high-voltage battery may be charged at energy stations, in addition to being charged by the conversion of the driving power produced by the combustion engine.

We have discovered that when an environment is extremely cold (for example, 20 degrees Fahrenheit or less), the warm-up time for the temperature of the cabin of a PHEV may be longer than desired. In certain cases, this may be due to the vehicle prioritizing a charge-depleting mode, in which the primary source of motive power is a battery and an electric motor.

SUMMARY

Further areas of applicability will become apparent from the description provided herein. It should be understood that the description and specific examples are intended for purposes of illustration only and are not intended to limit the scope of the present disclosure.

Disclosed herein is a method of operating a heating, ventilation, and air conditioning (HVAC) system for a hybrid electric vehicle. The vehicle may include a drivetrain having a both an engine and a motor connected via a clutch for driving the vehicle. The engine may include coolant that is operably connected to the HVAC system for delivering heat from the engine to the HVAC system. The method may include determining, by a first temperature sensor, an ambient temperature external the vehicle. The method may include determining, by a second temperature sensor, a fluid temperature of an engine coolant of the vehicle. The method may include determining, by a controller, whether the HVAC system is in a heating mode. The method may include operating the clutch to engage the engine, causing the engine to provide motive power to the wheels when a) the temperature external the vehicle is lower than a first predetermined value, when b) the temperature of the engine coolant is lower than a second predetermined value, and when c) the HVAC system is in a heating mode.

The present disclosure also describes a method of operating an HVAC system for a hybrid electric vehicle, the vehicle including a drivetrain having a both an engine and a motor connected via a clutch for driving the vehicle, and the engine including coolant that is operably connected to the HVAC system for delivering heat from the engine to the HVAC system. The method may include determining, by a first temperature sensor, an ambient temperature external the vehicle. The method may include determining, by a second temperature sensor, a fluid temperature of an engine coolant of the vehicle. The method may include determining, by an electronic control unit of the vehicle, a duration of inactivity of the engine of the vehicle. The method may include determining, by a controller, whether the HVAC system is in a heating mode. The method may include operating the clutch to engage the engine which causes the engine to provide motive power to the wheels when a) the temperature external the vehicle is lower than a first predetermined value, when b) the temperature of the engine coolant is lower than a second predetermined value, and when c) the HVAC system is in a heating mode.

DRAWINGS

In order that the disclosure may be well understood, there will now be described various forms thereof, given by way of example, reference being made to the accompanying drawings, in which.

Figure 1:
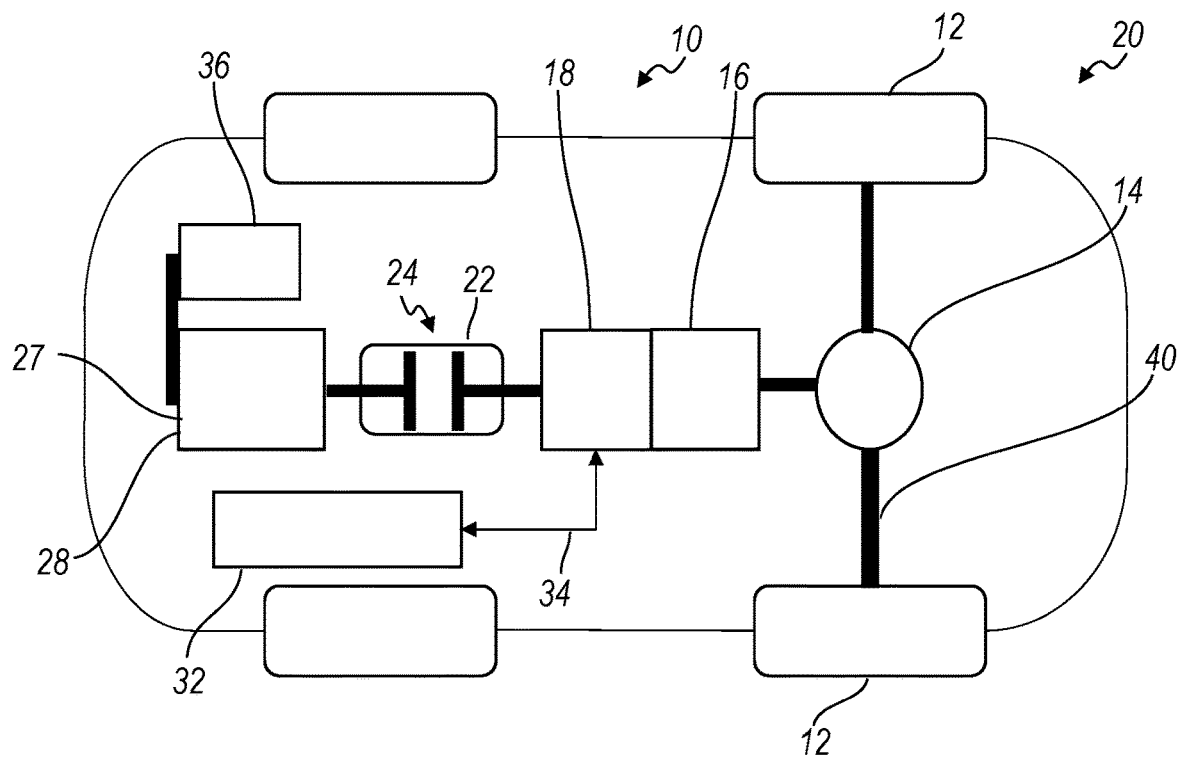
FIG. 1 is a schematic view of components of a vehicle in accordance with the principles of the present disclosure in which a clutch is disengaged.

The drawings described herein are for illustration purposes only and are not intended to limit the scope of the present disclosure in any way.

DESCRIPTION

The following description is merely exemplary in nature and is not intended to limit the present disclosure, application, or uses. It should be understood that throughout the drawings, corresponding reference numerals indicate like or corresponding parts and features.

The present disclosure is not limited to the matter disclosed below and will be understood in different forms which differ from each other. The examples provided merely make the disclosure complete and provide for fully informing the scope to those skilled in the art. In the drawings, like reference numerals refer to like elements.

Throughout this specification and the claims which follow, unless explicitly described to the contrary, the word "comprise" and variations such as "comprises" or "comprising" will be understood to imply the inclusion of stated elements but not the exclusion of any other elements.

As currently practiced, a PHEV may be charged to full from an external source, such as a wall outlet or a charging station, when not in use. This allows the battery to be used as the primary source of motive power as the vehicle starts. This state is known as a charge depleting mode, as the battery is drained while the vehicle operates in such a way. Although this mode of operation conserves fossil fuel by consuming battery energy first, we have discovered that in cold temperatures, the fact that the engine operates at a minimum, or does not operate at all, means that little or no engine heat is generated, and as a result, the engine coolant stays substantially the same temperature as it had been. A lack of heated coolant translates into less heat which can heat the cabin, thereby causing warm-up time for the cabin of the vehicle to increase.

In one aspect, the present disclosure describes methods of decreasing the amount of time required to heat the cabin of a PHEV by causing the engine to operate under conditions when, in a conventional PHEV, it ordinarily would not run. Rather than a charge depleting mode, the vehicle initiates a charge sustaining mode. In this mode, the clutch closes (or engages) while the vehicle is moving, allowing for more heat generation by the engine, which results in faster warm-up of engine coolant and, in turn, quicker heating of cabin air.

FIG. 1 illustrates a hybrid electric vehicle 10 having components that allow the methods described herein to be practice. The vehicle 10 is illustrated as being in a charge depleting mode 20; it includes clutch 22 which is in open or disengaged configuration 24. The vehicle 10 has wheels 12, and the driven set of wheels (which may be the front wheels only, or the rear wheels only, or all wheels of the vehicle) are connected via axle 40 to differential 14. The wheels 12 are operably coupled to motor 18 via transmission 16, and the motor 18 is in connection 34 with battery 32. The battery 32 provides the motor 18 with energy. The vehicle 10 also includes engine 28, which is part of drivetrain 27, the engine 28 being operably connected to clutch 22. The engine 28 is in connection with hybrid starter generator 36. When in charge depleting mode 20, the open state 24 of clutch 22 causes the engine 28 to be decoupled from the wheels 12 and as a result the wheels 12 are not driven by the engine.

Figure 2:
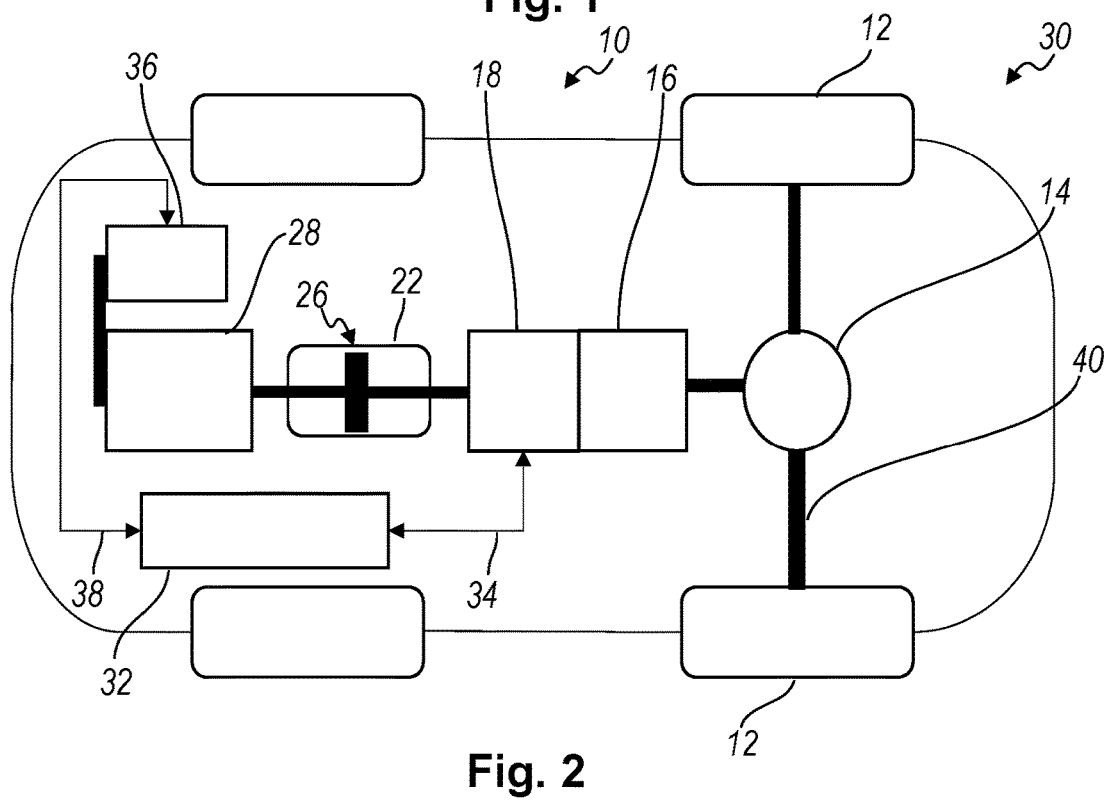
FIG. 2 is a view of the vehicle of FIG. 1 in which the clutch has been engaged.

FIG. 2 illustrates the vehicle 10 of FIG. 1, but in a charge sustaining configuration 30. In the charge sustaining configuration 30, the clutch 22 is instead in an engaged configuration 26, and the drivetrain 27 including the engine 28 is operably coupled to the wheels 12 and can provide them with motive force. The battery 32 may, in this mode, be charged by the hybrid starter generator 38 as the engine 28 provides the power that drives the vehicle 10. The battery may also be charged by the drive motor 18 while the engine 28 continues to provide power to the driven wheels 12.

Figure 3:
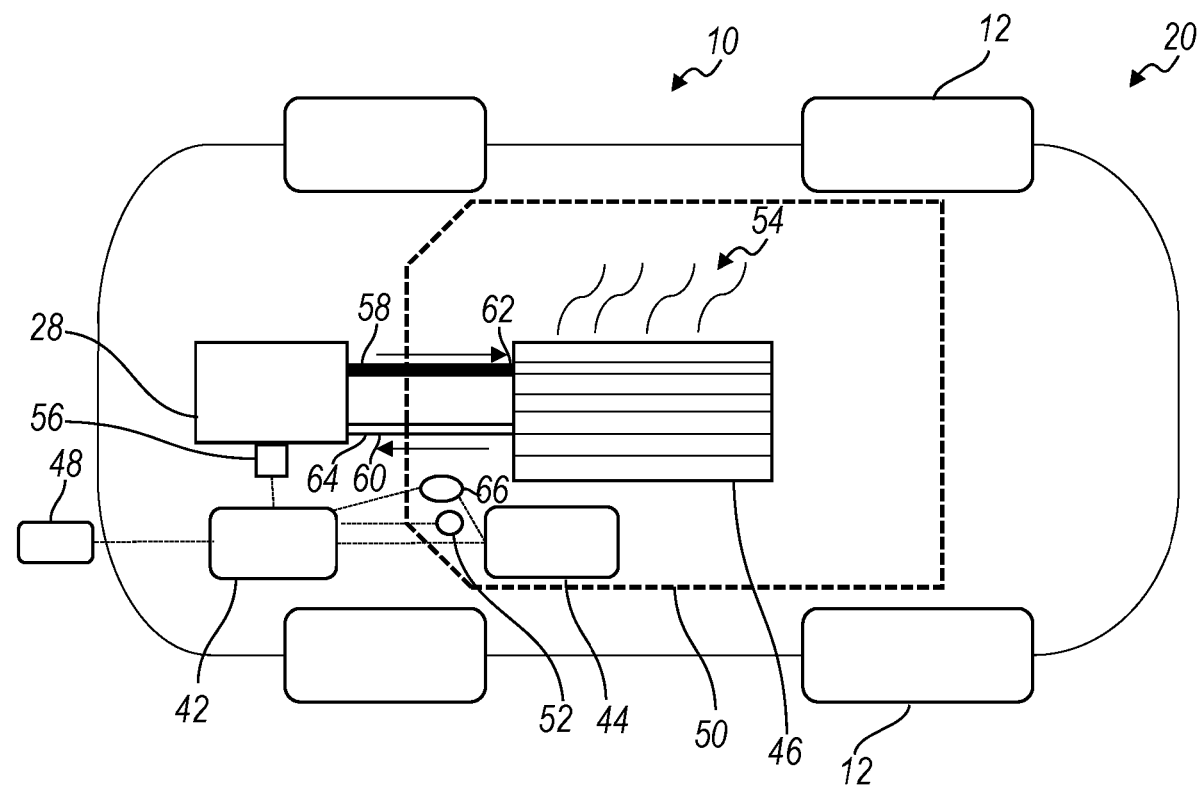
FIG. 3 is a schematic view of components of a vehicle in accordance with the principles of the present disclosure, particularly illustrating HVAC system components.

FIG. 3 is a schematic illustrating further components of the vehicle 10, particularly those that control, interface with, and constitute the HVAC system. In this figure, the vehicle 10 is seen to have a heat exchanger 46 connected to the engine 28 by a first conduit 58 and a second conduit 60. As indicated by the arrows in FIG. 3, the first conduit 58 conveys hot coolant 62 from the engine 28 to the heat exchanger 46, which allows heat 54 to be released into the cabin 50 of the vehicle 10 when cabin air is blown over the coils of the heat exchanger 46. Cold coolant 64 is then returned to the engine 28 via second conduit 60 to continue the process.

The vehicle 10 also includes an electronic control unit (ECU) 42, which may include a processor as described herein, and may interface with or include a hybrid control unit. The ECU 42 may be in communication with a plurality of temperature sensors that report information about the temperature in relation to various spaces within and outside of the vehicle 10. For instance, first temperature sensor 48 may be mounted on an exterior surface of the vehicle 10 and may collect information related to ambient (or external) temperature. Second temperature sensor 56 may be mounted on or near the engine 28 in order to report the temperature of the coolant being fed therethrough. The vehicle 10 may also optionally include a third temperature sensor 66 inside the cabin 50 of the vehicle 10, which reports an internal temperature of the cabin 50.

The ECU 42 may be in communication with a fully-automatic temperature control (FATC) system 44. The FATC may be accessible by a head unit in cabin 50 and may provide information to the ECU regarding conditions in the vehicle 10, such as whether the HVAC system is in an on or off state, including by monitoring an on/off switch 52. This switch 66 may be part of a head unit which is in communication with the FATC. The switch 66 can be actuated by a user in order to initiate heating or cooling.

The ECU, FATC, and HCU may each include at least one controller. It is understood that the methods disclosed herein may be executed by at least one controller. The term "controller" refers to a hardware device that includes a memory and a processor configured to execute one or more steps. The memory is configured to store algorithmic steps and the processor is specifically configured to execute said algorithmic steps to perform one or more processes which are described further herein.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion.

Figure 4:
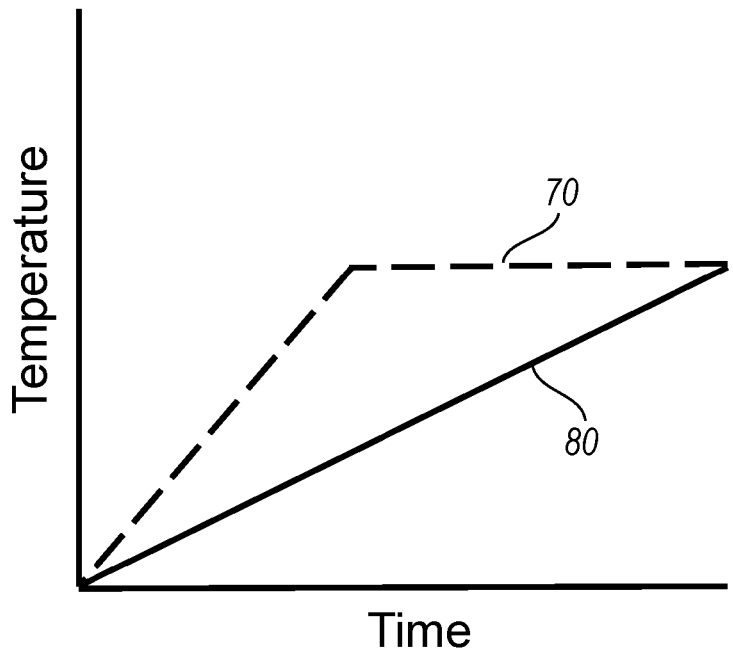
FIG. 4 is a graphical view of cabin temperature warm-up time in a conventional hybrid vehicle workflow in contrast with that of the present disclosure.

FIG. 4 provides an illustration of an improvement in heating time as realized by a method according to the present disclosure. A plot 80 in solid line shows the usual time in order to achieve a desired level of heating using a conventional heating workflow. A plot 70 in a dashed line shows that the desired temperature is reached in less time using a method as disclosed herein, and plateaus, with the vehicle cabin remaining at the desired temperature until further adjusted by a vehicle occupant. In one aspect, at an ambient temperature of about −11 degrees Celsius, the warm-up time may decrease by about 50 percent, such as from about 2400 seconds to about 1200 seconds.

Figure 5:
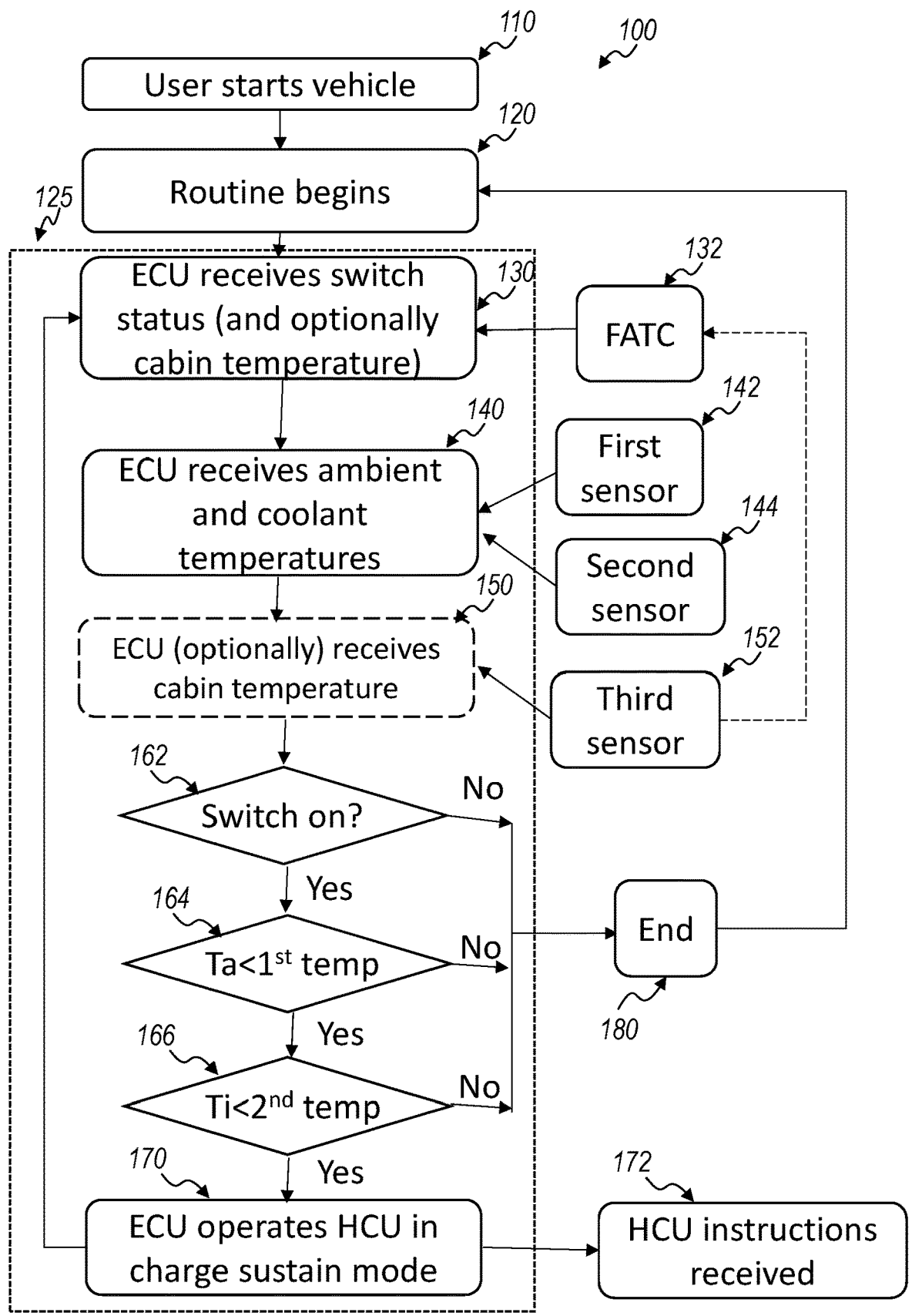
FIG. 5 is a flowchart describing a method of heating a vehicle in accordance with the principles of the present disclosure.

FIG. 5 illustrates steps of a method for improving initial warm-up in a hybrid electric vehicle and certain components that are involved with such a method. A person of skill in the art will recognize that certain steps may be added to or omitted from the method, and some steps may be performed in an order other than what is indicated in the figure. In addition, not all vehicle components are included in the flowchart of FIG. 5.

In a first step 110 of method 100, the user starts the vehicle, or otherwise indicates that the vehicle will be occupied and in use. The vehicle may be started by an on/off button that is actuated by the driver. The vehicle start step 110 leads to routine initiation step 120, which commences routine 125. In another aspect, the routine 125 may commence at some time after the vehicle starts.

Routine 125 includes a number of status checks for the cabin heating method. Among these, the ECU receives and monitors the status of the HVAC on/off switch from the FATC 132 in information receiving step 130. The ECU also receives the ambient temperature (the temperature external the vehicle) from the first temperature sensor 142 and the coolant temperature from the second temperature sensor 144 in information receiving step 140.

Optionally, in information receiving step 150, the ECU may receive an internal cabin temperature from third temperature sensor 152. In some instances, this temperature may be checked in order to confirm whether the cabin of the vehicle requires heating in view of the threshold temperature to be attained. In some instances, the third temperature sensor 152 may be included in FATC 132, and in some aspects the reading from the third temperature sensor may be reported to the ECU at the same time as the switch ON/OFF status. Not including a third temperature sensor 152 may in some cases have no discernible effect on cabin warming. In other cases, the lack of a check of cabin temperature may contribute to a small decline in fuel economy if the engine runs longer than needed and does not shut down when the threshold temperature is reached.

When the values have been attained, the ECU checks whether the switch is on 162, whether the ambient temperature ($T_a$) is lower than a first predetermined value 164, and whether the coolant temperature ($T_t$) is lower than a second predetermined value 166. In one aspect, the first predetermined value 164 may be approximately or equal to 20 degrees Fahrenheit, or approximately or equal to 20 degrees Fahrenheit, or approximately or equal to 25 degrees Fahrenheit, or approximately or equal to 30 degrees Fahrenheit, or approximately or equal to 20 degrees Fahrenheit, or any temperature below about 35 degrees Fahrenheit.

Optionally, if a third temperature tensor 152 is employed, the ECU also checks whether the cabin temperature is lower than a third predetermined value. If all conditions are true, then the ECU operates the hybrid control unit (HCU) in a charge sustaining mode. In the charge sustaining mode, the clutch is engaged, and the vehicle principally receives motive power from the engine. This increases the load on the engine, which in turn generates thermal energy and causes the temperature of the engine coolant to increase at a quicker rate than under default idling conditions.

The method may include a step of transmitting the instructions to operate in charge sustaining mode to the HCU 172, and the HCU reporting to the ECU that these instructions have been received.

If any of the values checked by the ECU are false (e.g., the switch has been set to off, the ambient temperature exceeds the value predetermined to necessitate accelerated warm-up, etc.) the routine will end 180. When the routine ends, the ECU will no longer instruct the HCU to prioritize a charge sustaining mode when idling, and normal operation will resume. After the routine ends, it may be restarted manually by the driver. Alternatively, the routine may restart automatically if the threshold values are not met or exceeded (for example, if the ambient temperature decreases while the vehicle is in operation, or the cabin temperature drops significantly.) The ECU may check sensor and/or switch input on a regular basis, or substantially continuously, during vehicle operation, in order to determine whether conditions for reinitiating the routine 125 have been met.

Figure 6:
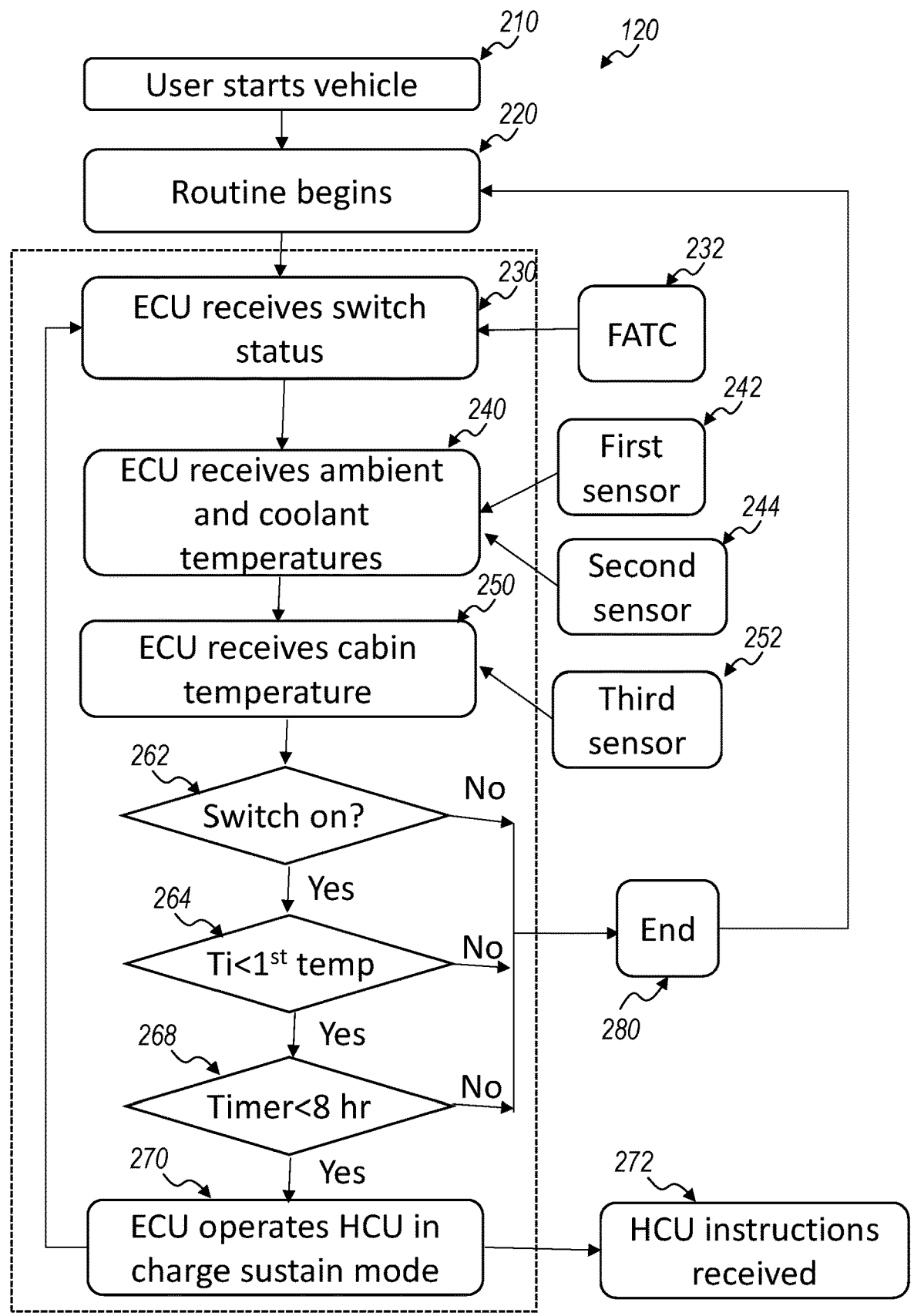
FIG. 6 is a flowchart describing a method of heating a vehicle in accordance with another aspect of the present disclosure.

FIG. 6 illustrates a method similar to that disclosed in FIG. 5. Similar reference numbers indicate similar functions or components. In this instance, instead of or in addition to a first sensor 242 for monitoring ambient temperature, the ECU (or another component including a controller) may include an engine-off time counter. A predetermined time value (such as about 8 hours) may be set such that when the vehicle has not been in operation for at least the threshold amount of time 268, the powertrain temperature may be assumed to be equal to the ambient temperature, eliminating the need for an ambient temperature check in the ECU workflow. Such a timer-based method may be used as a backup to the temperature sensor workflow, or may replace it. However, if insufficient time has passed since the vehicle was last operated, the engine may not attain temperature homeostasis with the environment.

The present methods allow for additional heat generation in a hybrid electric vehicle when the vehicle is in motion. The ECU and HCU may be programmed with other modes that increase the efficiency of cabin heating for times when the vehicle is not in motion (for instance, engaging the clutch to generate waste heat while idling.) The present methods prioritize cabin heating over other methods, such as catalyst heating or relying on off-board heat sources. The initial running of the engine to heat the cabin may likewise cause the vehicle to have engine-off true electric vehicle performance from the powertrain system in a shorter period of time from the initial start.

The methods as described in the present disclosure may be practiced both with manually-operated and with autonomous vehicles.

Those skilled in the art will appreciate that various modifications, additions and substitutions are possible, without departing from the scope and spirit of the disclosure in the accompanying claims.

What is claimed is:

1. A method of operating an HVAC system for a hybrid electric vehicle, the vehicle including a drivetrain having a both an engine and a motor connected via a clutch for driving the vehicle, the engine including coolant that is operably connected to the HVAC system for delivering heat from the engine to the HVAC system, the method comprising:
   determining, by a first temperature sensor, an ambient temperature external the vehicle;
   determining, by a second temperature sensor, a fluid temperature of an engine coolant of the vehicle;
   determining, by a controller, whether the HVAC system is in a heating mode; and
   operating the clutch to engage the engine and cause the engine to provide motive power to the wheels when: a) the temperature external the vehicle is lower than a first predetermined value, b) the temperature of the engine coolant is lower than a second predetermined value, and c) the HVAC system is in a heating mode.

2. The method of claim 1, wherein the step of determining whether the HVAC system is in a heating mode includes determining whether the temperature of the cabin is lower than a third predetermined value.

3. The method of claim 1, further comprising a step of determining, by a third temperature sensor, a temperature of a cabin of the vehicle, and wherein the step of determining whether the HVAC system is in a heating mode includes determining whether temperature of the cabin is lower than a third predetermined value.

4. The method of claim 1, wherein the step of determining whether the HVAC system is in a heating mode comprises monitoring an on/off switch of the HVAC system.

5. The method of claim 1, wherein the step of operating the clutch include operating the vehicle in a charge sustaining mode wherein a charge of a battery powering the motor is maintained within a predetermined range.

6. The method of claim 1, wherein the temperature sensors transmit the respective temperatures to an electronic control unit of the vehicle.

7. The method of claim 6, wherein the electronic control unit transmits operating instructions to the hybrid control unit.

8. The method of claim 1, wherein one of the temperature external the vehicle, the temperature of the cabin, and the temperature of the engine coolant is equal to or greater than the respective predetermined value, the hybrid control unit utilizes a charge depleting mode for motive power.

9. The method of claim 1, wherein the method initiates any time after a user starts the vehicle.

10. The method of claim 1, wherein the first predetermined value is 20 degrees Fahrenheit.

11. The method of claim 1, wherein one of the temperature external the vehicle and the temperature of the engine coolant is equal to or greater than the respective predetermined value, the hybrid control unit utilizes a charge depleting mode for motive power.

12. A method of operating an HVAC system for a hybrid electric vehicle, the vehicle including a drivetrain having a both an engine and a motor connected via a clutch for driving the vehicle, the engine including coolant that is operably connected to the HVAC system for delivering heat from the engine to the HVAC system, the method comprising:
   determining, by a first temperature sensor, an ambient temperature external the vehicle;
   determining, by a second temperature sensor, a fluid temperature of an engine coolant of the vehicle;
   determining, by an electronic control unit of the vehicle, a duration of inactivity of the engine of the vehicle;
   determining, by a controller, whether the HVAC system is in a heating mode; and
   operating the clutch to engage the engine and cause the engine to provide motive power to the wheels when: a) the temperature external the vehicle is lower than a first predetermined value, b) the temperature of the engine coolant is lower than a second predetermined value, and c) the HVAC system is in a heating mode.

13. The method of claim 12, wherein the temperature sensors transmit the respective temperatures to an electronic control unit of the vehicle.

14. The method of claim 12, wherein the electronic control unit transmits operating instructions to the hybrid control unit.

15. The method of claim 12, wherein one of the temperature of the cabin and the temperature of the engine coolant is equal to or greater than the respective predetermined value, the hybrid control unit utilizes a charge depleting mode for motive power.

16. The method of claim 12, wherein the method initiates when a user starts the vehicle.

17. The method of claim 12, wherein the third predetermined value is eight hours.

18. The method of claim 12, wherein the step of determining whether the HVAC system is in a heating mode comprises monitoring an on/off switch of the HVAC system.

19. The method of claim 12, wherein the first predetermined value is 20 degrees Fahrenheit.

* * * * *